(12) United States Patent
Miyamoto (10) Patent No.: US 6,914,859 B2
(45) Date of Patent: Jul. 5, 2005

(54) METHOD OF RECORDING AND/OR REPRODUCING INFORMATION ONTO/ FROM AN INFORMATION STORAGE MEDIUM AND AN INFORMATION-RECORDING AND/OR INFORMATION-REPRODUCING DEVICE

(75) Inventor: Takashi Miyamoto, Tokorozawa (JP)

(73) Assignee: TEAC Corporation (JP)

( * ) Notice: Subject to any disclaimer, the term of this patent is extended or adjusted under 35 U.S.C. 154(b) by 339 days.

(21) Appl. No.: 10/360,358

(22) Filed: Feb. 6, 2003

(65) Prior Publication Data

US 2003/0152005 A1 Aug. 14, 2003

(30) Foreign Application Priority Data

Feb. 12, 2002 (JP) .......................................... 2002-034492

(51) Int. Cl.7 .................................................. G11B 7/00
(52) U.S. Cl. ................... 369/47.11; 369/53.1; 369/59.1
(58) Field of Search .............................. 369/47.1, 47.11, 369/47.28, 53.1, 53.37, 53.45, 59.1

(56) References Cited

U.S. PATENT DOCUMENTS 6,249,496 B1 * 6/2001 Tsukahara et al. ....... 369/44.28
6,804,177 B1 * 10/2004 Rieck et al. ............. 369/30.15

OTHER PUBLICATIONS

Japanese Laid–Open Patent Application No. 9–17116, laid open on Jan. 17, 1997 with attached English Abstract.
Japanese Laid–Open Patent Application No. 8–212679, laid open on Aug. 20, 1996 with attached English Abstract.

* cited by examiner

Primary Examiner—Muhammad Edun
(74) Attorney, Agent, or Firm—Anderson Kill & Olick, PC

(57) ABSTRACT

A method of recording and/or reproducing information onto/from an information storage medium includes the step of detecting a time interval between a received command and a subsequent command. The method further includes the step of controlling recording and/or reproducing-speed of information on the basis of the detected time interval between the received command and the subsequent command.

14 Claims, 9 Drawing Sheets

FIG.8

METHOD OF RECORDING AND/OR REPRODUCING INFORMATION ONTO/ FROM AN INFORMATION STORAGE MEDIUM AND AN INFORMATION-RECORDING AND/OR INFORMATION-REPRODUCING DEVICE

BACKGROUND OF THE INVENTION

1. Field of the Invention

The present invention relates to a method of recording and/or reproducing information and a device for recording and/or reproducing information, and particularly relates to a method of recording and/or reproducing information and a device for recording and/or reproducing information while driving an information storage medium.

Recently, disk drives such as CD-ROM/CD-R/CD-RW drives have been required to operate at a higher reproduction speed. In order to achieve the higher reproduction speed of the disk drives, it is necessary to increase rotational speed of the disk. Due to the increased rotational speed, there is a problem of increased noise and power consumption by the disk drives.

In a case of low-data transmission rate, noise and power consumption of the disk drive may be reduced by decreasing the rotational speed of the disk.

2. Description of the Related Art

A method of optimizing reproduction speed of a disk drive by controlling rotational speed of the disk is known from JP-A-9-17116. According to the method described therein, the amount of data in a buffer is monitored to control the rotational speed of the disk. The amount of audio data in the buffer is detected upon reading information such as audio data. When the amount of audio data in the buffer becomes great, the rotational speed of the disk is reduced and when the amount of audio data in the buffer becomes small, the rotational speed of the disk is increased.

Such a method of controlling rotational speed of the disk based on the amount of data in the buffer is effective for a sequential access mode, e.g., for writing and reading audio data, however, it is not suitable for a random access mode, e.g., for writing and reading normal data.

In a random access mode, data stored in the buffer are destroyed for each command. Therefore, the buffer is never filled up with data. Thus, according to the control method described above, the disk will always rotate at maximum speed. Therefore, the noise and the power consumption cannot be reduced.

SUMMARY OF THE INVENTION

Accordingly, it is a general object of the present invention to provide a method of reproducing information that can obviate the problems described above.

It is another and more specific object of the present invention to provide a method of recording and/or reproducing information onto/from an information storage medium and an information-recording and/or information-reproducing device that can reduce power consumption and noise in a random access mode.

In order to achieve the above objects according to the present invention, a method of recording and/or reproducing information onto/from an information storage medium includes the steps of detecting a time interval between a received command and a subsequent command and controlling recording- and/or reproducing-speed of the information on the basis of the detected time interval.

Also, according to the present invention, a device for recording information onto an information storage medium and/or reproducing information from the information storage medium includes a detector for detecting a time interval between a received command and a subsequent command and a controller for controlling recording- and/or reproducing-speed of the information on the basis of the detected time intervals.

With the method and device described above, power consumption and noise can be reduced when it is not necessary to perform a high-speed access to the information storage medium.

DETAILED DESCRIPTION OF THE PREFERRED EMBODIMENTS

In the following, principles and embodiments of the present invention will be described with reference to the accompanying drawings.

Figure 1:
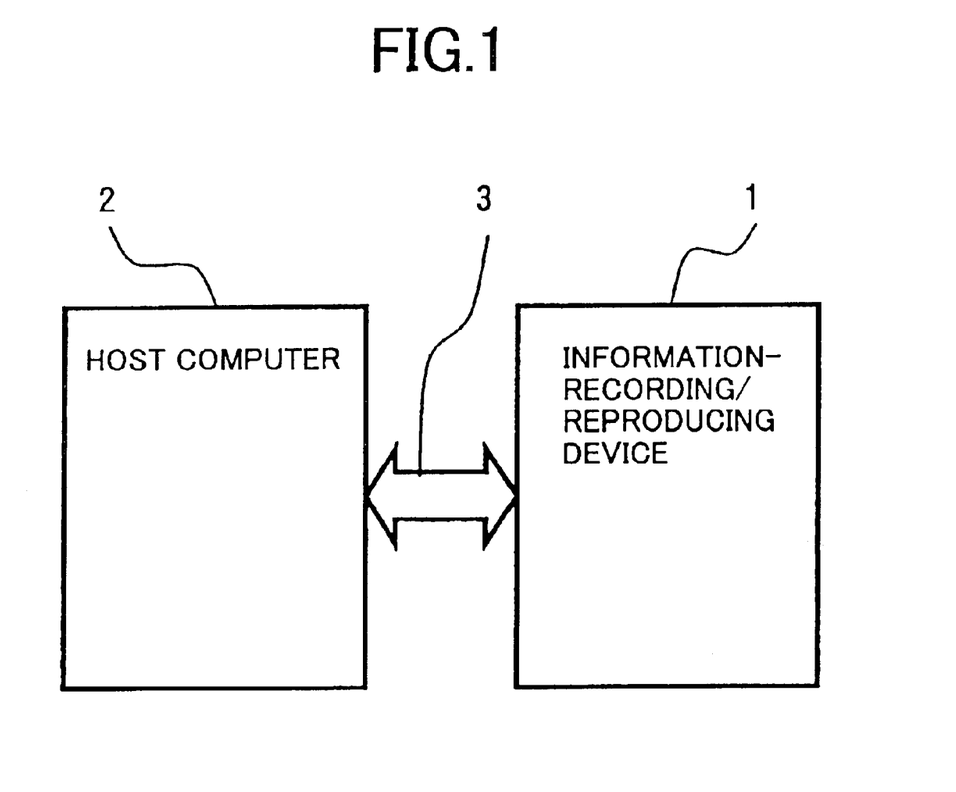
FIG. 1 is a block diagram showing the system configuration of an embodiment of the present invention.

FIG. 1 is a block diagram showing the configuration of a system of an embodiment of the present invention. The system of the present embodiment includes an information-recording and/or reproducing device 1 and a host computer 2 connected thereto via an interface 3 such as IDE (integrated device electronics), SCSI (small computer system interface) or USB (universal serial bus). In the following description, an optical disk device such as a CD-ROM, CD-R or CD-RW drive will be taken as an example of the information-recording and/or reproducing device 1 of the present invention.

Figure 2:
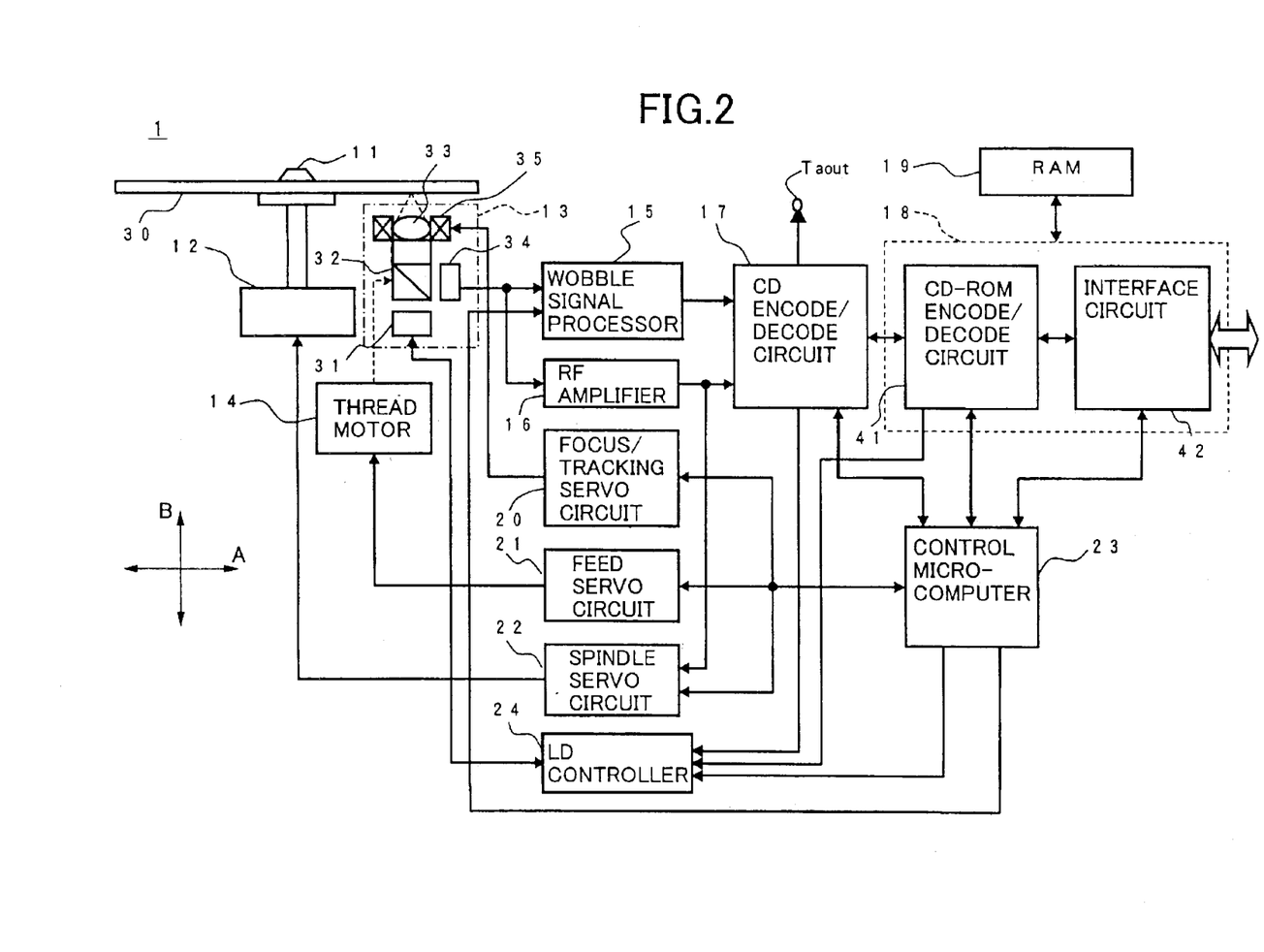
FIG. 2 is a block diagram showing the information-recording/reproducing device of FIG. 1.

FIG. 2 is a block diagram showing the information-recording and/or reproducing device 1. The information-recording and/or reproducing device 1 of the present embodiment is capable of recording and/or reproducing at various recording and/or reproduction speeds. The information-recording and/or reproducing device 1 includes a turn table 11, a spindle motor 12, an optical pick-up 13, a thread motor 14, a wobble signal processing part 15, an RF (radio frequency) amplifier 16, a CD encode/decode circuit 17, an interface circuit part 18, a RAM (random access memory) 19, a focus/tracking servo circuit 20, a feed servo circuit 21, a spindle servo circuit 22, a control microcomputer 23 and an LD (laser diode) controller 24.

An information storage medium such as a disk 30 is mounted on the turn table 11. The turn table 11 is coupled to the spindle motor 12 and rotates the disk 30 in accordance with the rotation of the spindle motor 12. The disk 30 is positioned to oppose the optical pick-up 13.

The optical pick up 13 includes a light-emitting element 31, an optical system 32, an objective lens 33, a light-receiving element 34 and a focus/tracking actuator 35. The light-emitting element 31 includes elements such as a laser diode and emits a laser beam in accordance with driving signals supplied from the LD controller 24. The laser beam emitted from the light-emitting element 31 is supplied to the optical system 32.

The optical system 32 is provided to shape and/or separate the laser beam emitted from the light-emitting element 31 such that the cross-section of the laser beam becomes circular. The objective lens 33 converges the laser beam from the optical system 32 onto the disk 30. The objective lens 33 is movable by means of the focus/tracking actuator 35 in radial directions of the disk 30, i.e., directions indicated by an arrow A, and in the directions perpendicular to the surface of the disk 30, i.e., directions indicated by an arrow B.

The focus/tracking actuator 35 is driven in accordance with servo signals supplied from the focus/tracking servo circuit 20, so as to perform tracking control by moving the objective lens 33 in the directions shown by the arrow A and to perform focus control by moving the objective lens 33 in the directions shown by the arrow B.

The laser beam irradiated on the disk 30 is reflected by the disk 30 and supplied again to the optical system 32 via the objective lens 33. The reflected light from the disk 30 is bent at the optical system 32 and is supplied to the light-receiving element 34.

The light-receiving element 34 converts the reflected light from the disk 30 into electric signals. The electric signals converted at the light-receiving element 34 are supplied to the wobble signal processing part 15 and the RF amplifier 16.

The wobble signal processing part 15 is supplied with signals from the light-receiving element 34 and with clocks from the control microcomputer 23. The wobble signal processing part 15 extracts wobble signals using the signals from the light-receiving element 34 and the clocks from the control microcomputer 23. The wobble signals extracted at the wobble signal processing part 15 are supplied to the CD encode/decode circuit 17. Also, the RF amplifier 16 amplifies the signals from the light-receiving element 34 and supplies them to the CD encode/decode circuit 17.

The CD encode/decode circuit 17 obtains ATIP information from the wobble signals from the wobble signal processing part 15. The CD encode/decode circuit 17 controls operations upon encoding based on the obtained ATIP information. Also, when the disk 30 is a CD, upon reproduction, the CD encode/decode circuit 17 decodes audio information from the signals supplied from the RF amplifier 16 and supplies the audio signals corresponding to the audio information to an output terminal $T_{aout}$ and to the interface circuit part 18. Further, the CD encode/decode circuit 17 is supplied with audio information from the interface circuit part 18 upon recording audio information. The CD encode/decode circuit 17 performs encoding of the audio data upon recording. The encoded information is supplied to the LD controller 24.

The interface circuit part 18 includes the CD-ROM encode/decode circuit 41 and an interface circuit 42. In a case where the disk 30 is a CD-ROM disk, the CD-ROM encode/decode circuit 41 decodes information from the signals supplied from the RF amplifier 16. The decoded signals are supplied to the interface circuit 42.

Also, upon recording, the CD-ROM encode/decode circuit 41 is supplied with information to be recorded from the interface circuit 42. The CD-ROM encode/decode circuit 41 encodes the information to be recorded from the interface circuit 42. The encoded information is supplied to the LD controller 24.

The LD controller 24 is supplied with information encoded in the CD encode/decode circuit 17 or the CD-ROM encode/decode circuit 41. The LD controller 24 drives the light-emitting element 31 based on the encoded information. Thus, the encoded information is recorded in the disk 30.

The interface circuit 42 serves as an interface between the host computer 2 and the CD-ROM encode/decode circuit 41. Also, the interface circuit 42 buffers the information to be reproduced from the CD-ROM encode/decode circuit 41 into the RAM 19 during reproduction and buffers the information from the host computer 2 into the RAM 19 during recording. Further, the interface circuit 42 detects commands such as write commands and read commands from the host computer and supplies them to the control microcomputer 23.

The control microcomputer 23 detects a time interval between a received command and a subsequent command from the host computer 2 and controls the speed of recording information onto the information storage medium and/or reproducing information from the information storage medium on the basis of the detected time interval between the commands.

Also, the control microcomputer 23 controls information-recording speed and/or information-reproduction speed on the basis of the result of division of the time interval between commands from the host computer 2 by the number of blocks of information sent by the commands. The control microcomputer 23 may control the information-recording speed and/or information reproduction speed on the basis of the average value of a plurality of command intervals or may control the information-recording speed and/or information reproduction speed when the number of blocks of the information sent out has reached a predetermined number of blocks.

In order to control the recording speed and/or reproduction speed, the control microcomputer 23 controls the recording speed and/or reproduction speed in accordance with a predetermined step. In detail, the control microcomputer 23 controls the rotational speed of the spindle motor 12 that rotates the disk 30 on the basis of the detected read command intervals.

In the following, an operation of the control microcomputer 23 will be described in detail.

Figure 3:
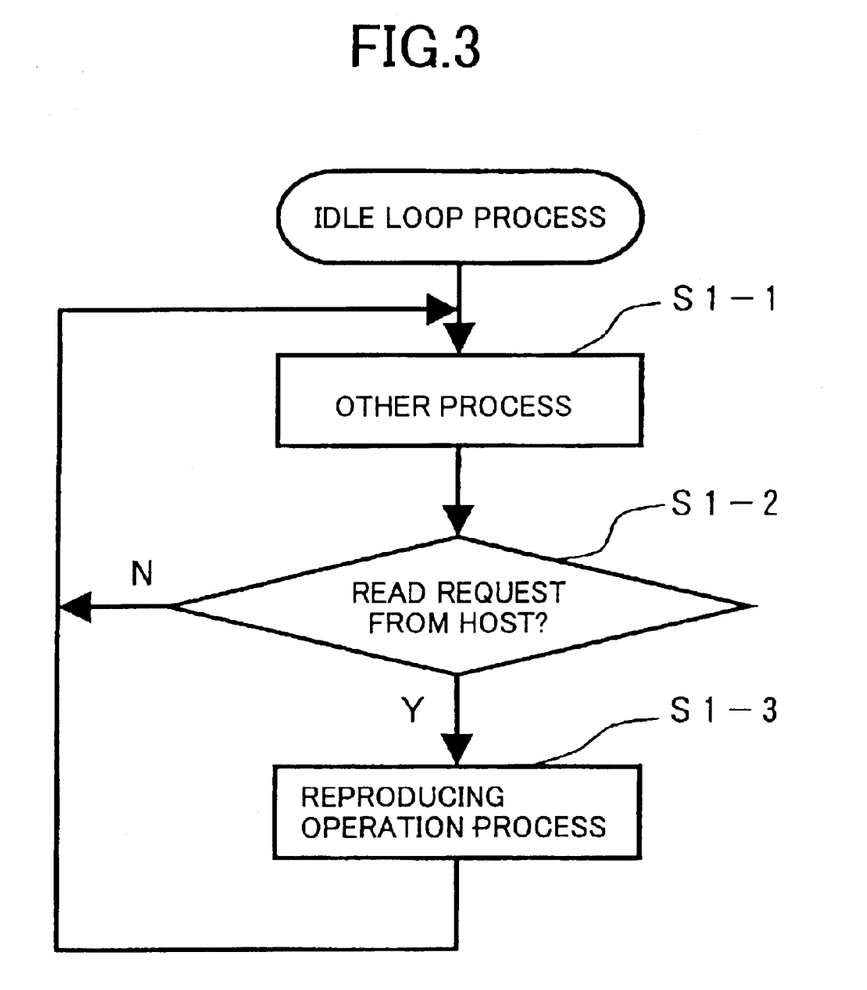
FIG. 3 is a flowchart of an idle loop process of the control microcomputer of FIG. 1.

FIG. 3 shows a flowchart of an idle loop process of the control microcomputer 23 that may be performed, for example, during a reproduction operation.

The control microcomputer 23 performs other processes at step S1-1. When there is a reproduction request from the host computer 2, the control microcomputer 23 performs a reproduction operation process in step S1-3.

The reproduction operation process of step S1-3 will be described in detail.

Figure 4:
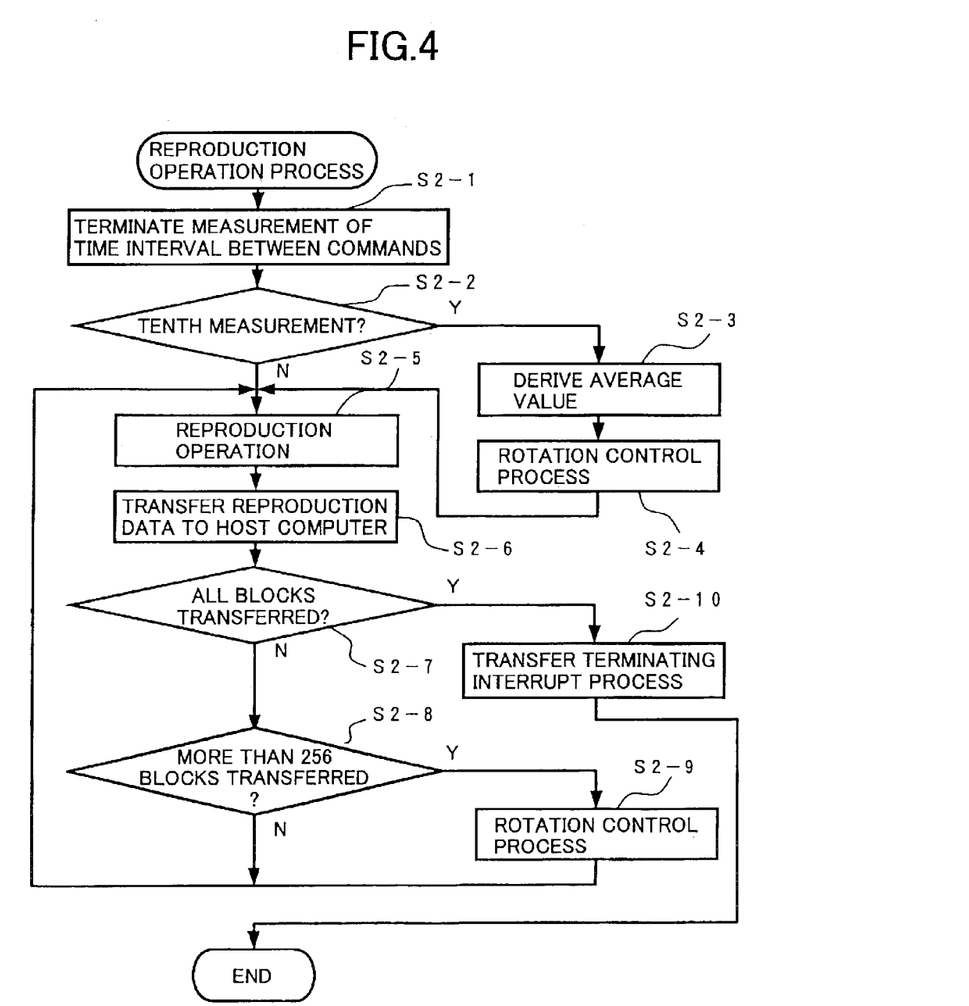
FIG. 4 is a flowchart of a reproduction process of the control microcomputer of FIG. 1.

FIG. 4 shows a flowchart of the reproduction operation process of the control microcomputer 23.

In the reproduction operation process, the control microcomputer 23 terminates measurement of a time interval between subsequent commands in step S2-1. Then, in step S2-2, the control microcomputer 23 determines whether the terminated measurement of time interval between commands is the tenth measurement. It is to be noted that the number of measurement to be determined is not limited to ten, but may be of any other integer number of times greater than one.

When it is determined in S2-2 that it is the tenth measurement, an average of ten measurements is derived in step S2-3. In step S2-3, the average may be derived by dividing the sum of the ten time interval measurements by the total number of blocks of the data requested by the ten commands. In other words, an average value of the processing time per block is derived.

Then, in step S2-4, the control microcomputer 23 performs a rotation control process based on the derived average value.

Figure 5:
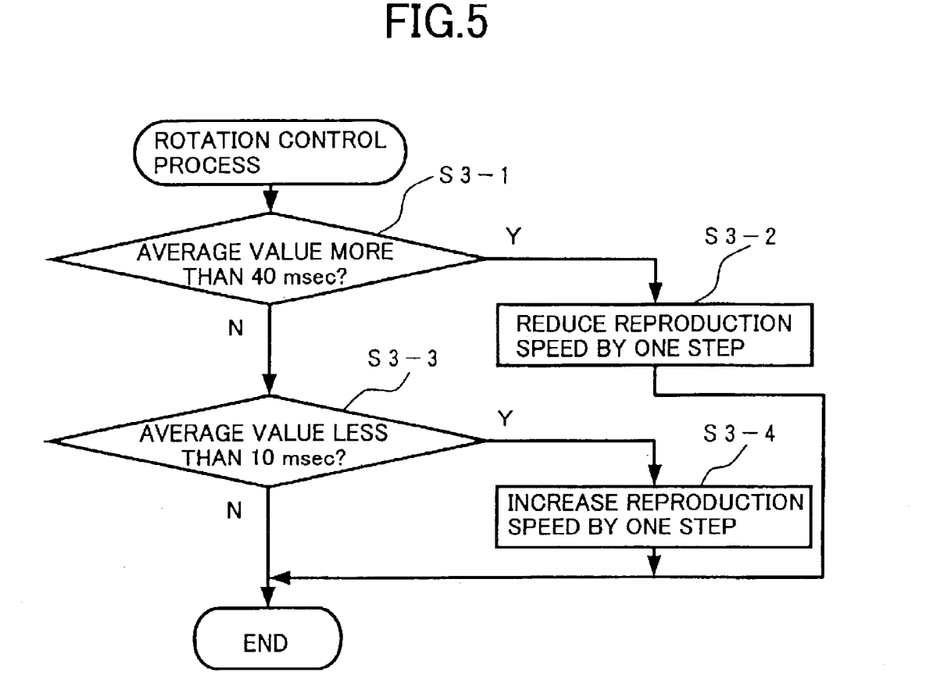
FIG. 5 is a flowchart of a rotation control process of a control microcomputer.

FIG. 5 shows a flowchart of a rotation control process, i.e., a reproduction speed control process of the control microcomputer 23.

In the rotation speed control process, it is determined in step S3-1 whether the average value derived in step S2-3 is greater than or equal to 40 msec. If it is determined in step S3-1 that the average value is greater than or equal to 40 msec, the command interval is long and therefore reproduction may be performed at a lower speed. Accordingly, the reproduction speed is reduced by one step in step S3-2. The reproduction speed may be reduced by reducing the rotational speed of the spindle motor 12 and by modifying the gain of the servo system, such as the focus/tracking servo circuit 20, the feed servo circuit 21, and the spindle servo circuit 22, in accordance with the rotational speed. For example, with a disk drive capable of reproducing information at reproduction speeds of 4X, 8X, 12X, 24X, 32X, 40X and 48X, the reproduction speed is controlled such that the reproduction speed is reduced from 48X to 40X, 40X to 32X, 32X to 24X, 24X to 16X, 16X to 8X, and 8X to 4X.

If it is determined in step S3-1 that the average value derived in step S2-3 is less than 40 msec, the process proceeds to step S3-3 to determined whether the average value derived in step S2-3 is less than or equal to 10 msec. If it is determined in step S3-3 that the average value derived in step S2-3 is less than or equal to 10 msec, the reproduction speed is increased by one step in step S3-4. Also, if it is determined in step S3-3 that the average value derived in step S2-3 is greater than 10 msec, the process terminates without changing the reproduction speed.

The reproduction speed may be increased by increasing the rotational speed of the spindle motor 12 and by modifying the gain of the servo system, such as the focus/tracking servo circuit 20, the feed servo circuit 21, and the spindle servo circuit 22, in accordance with the rotational speed. For example, with a disk drive capable of reproducing information at reproduction speeds of 4X, 8X, 12X, 24X, 32X, 40X and 48X, the reproduction speed is controlled such that the reproduction speed is increased from 4X to 8X, 8X, to 16X, 16X to 24X, 24X to 32X, 32X to 40X, and 40X to 48X.

As has been described above, a sudden change of the reproduction speed can be prevented by gradually changing the reproduction speed in a step-by-step manner. Therefore, it is possible to obviate an increase of power consumption and occurrence of noise due to the change of reproduction speed.

In this manner, the rotation control process S2-4 is terminated.

An optimum rotational speed during the rotation control process will be described.

Figure 6A:
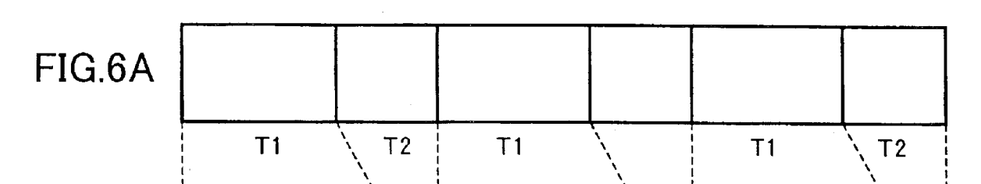
FIGS. 6A through 6D are diagrams showing time intervals between commands.
Figure 6B:
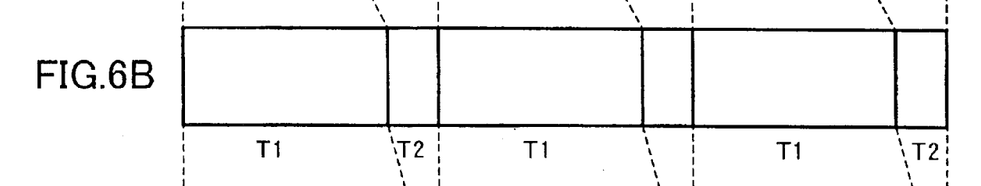
Figure 6C:
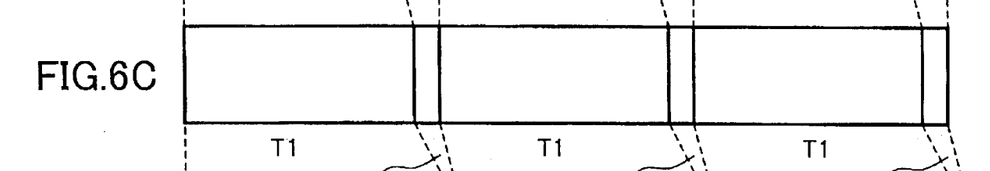
Figure 6D:
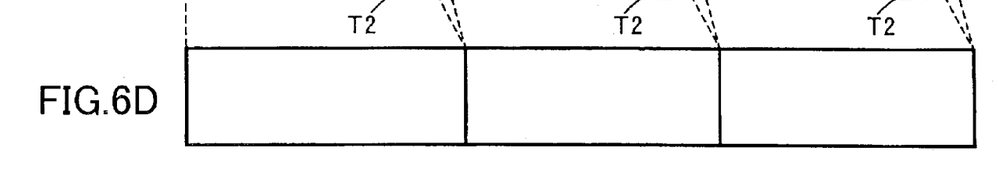

FIGS. 6A through 6D are diagrams showing time intervals of the commands such as write commands and read commands. FIG. 6A shows a state of the commands under a high-speed rotation condition, FIGS. 6B and 6C show states of the commands under moderate speed rotation conditions and FIG. 6D shows a state of the commands under a low-speed rotation condition.

As can be seen in FIG. 6A, when the rotational speed of the disk is higher than the executing speed of the commands, time period T2 of an idle state becomes long and significant relative to the command-executing time period T1. In this state, since the time period T2 of an idle state is long, there is a considerable waste of time.

When the rotational speed of the disk is reduced from the state shown in FIG. 6A, the command-executing time period T1 becomes longer and the idle state time period T2 becomes shorter as shown in FIG. 6B. When the rotational speed of the disk is further reduced from the state shown in FIG. 6B, the command-executing time period T1 becomes longer and the idle state time period T2 becomes shorter as shown in FIG. 6C, and it reaches a state where the rotational speed cannot be reduced any more.

If it is attempted to further reduce the rotational speed of the disk from the state shown in FIG. 6C, the command-executing time period T1 becomes longer and there will be no idle state time period T2. In such a state, the write or read operation cannot satisfy the request from the host computer 2 and therefore it is necessary to increase the rotational speed of the disk 30.

Figure 7:
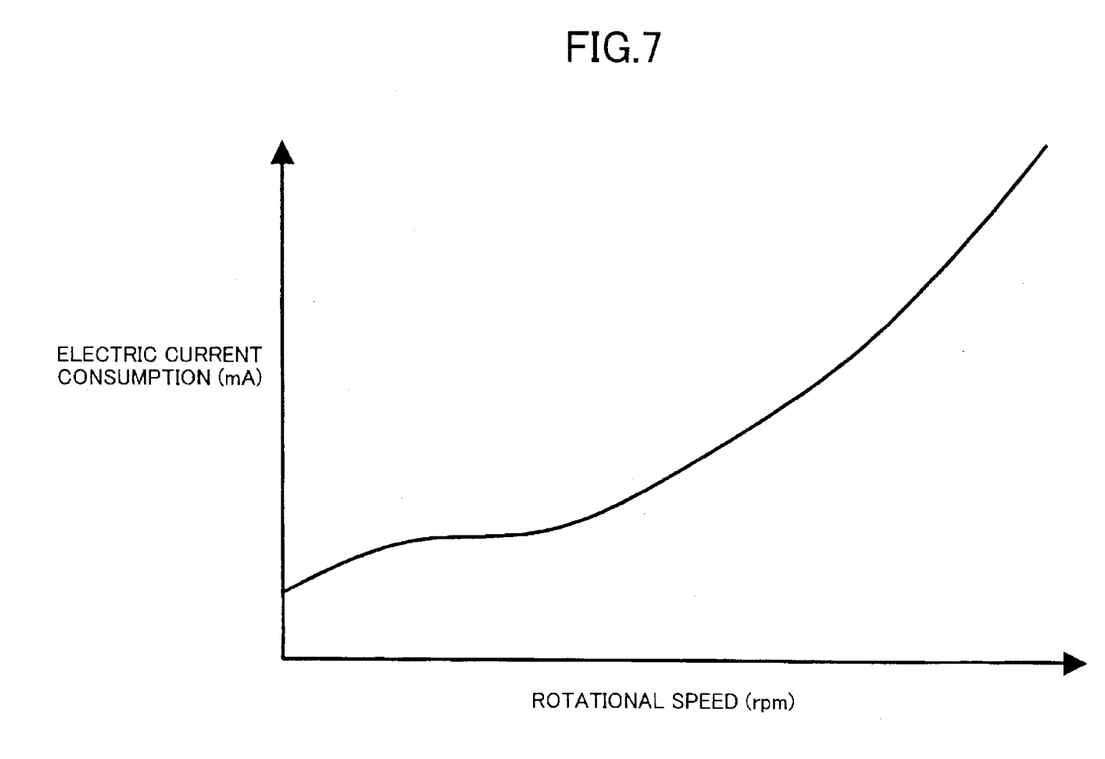
FIG. 7 shows a characteristic curve of current consumption against rotational speed of a disk.
Figure 8:
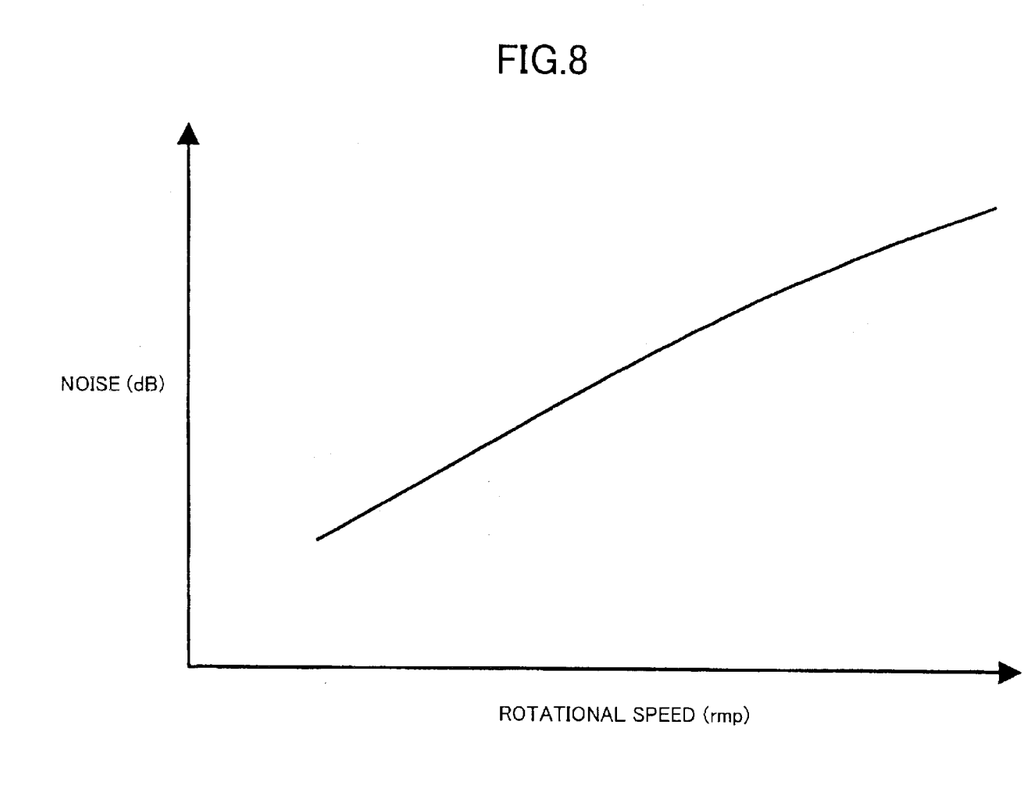
FIG. 8 shows a characteristic curve of noise against rotational speed of a disk.

FIG. 7 shows a graph of a characteristic curve of electric current consumption against rotational speed of the disk 30 and FIG. 8 shows a graph of noise against rotational speed of the disk 30.

As can be seen in FIGS. 7 and 8, the electric current consumption and noise decrease as the rotational speed becomes small.

Accordingly, the optimum rotational speed of the disk 30 is at the state shown in FIG. 6B or FIG. 6C. Therefore, electric current consumption and noise can be reduced by performing the rotation control process such that the speeds shown in FIGS. 6B and 6C can be achieved.

Referring back to FIG. 4, the reproduction operation process will be described.

The control microcomputer 23 performs, for example, a reproduction operation in step S2-5 when it is determined in step S2-2 that the time interval measurement has been carried out less than ten times, or after the rotation control process in step S2-4.

Then, in step S2-6, the control microcomputer 23 transfers the reproduced data to the host computer 2. In step S2-7, control microcomputer 23 determines whether the all blocks of data requested have been transferred to the host computer 2.

If the data of all blocks requested in step S2-7 have not been transferred to the host computer 2, the control microcomputer 23 determines in step S2-8 whether more than 256 blocks of data in total have been transferred. If it is determined in step S2-8 that more than 256 blocks of data have been transferred, the rotation control process of FIG. 5 is performed in step S2-9.

Also, if it is determined in step S2-7 that all blocks of data have been transferred to the host computer 2, a transfer terminating interrupt process is performed in step S2-10.

Now, the transfer terminating interrupt process of step S2-10 will be described.

Figure 9:
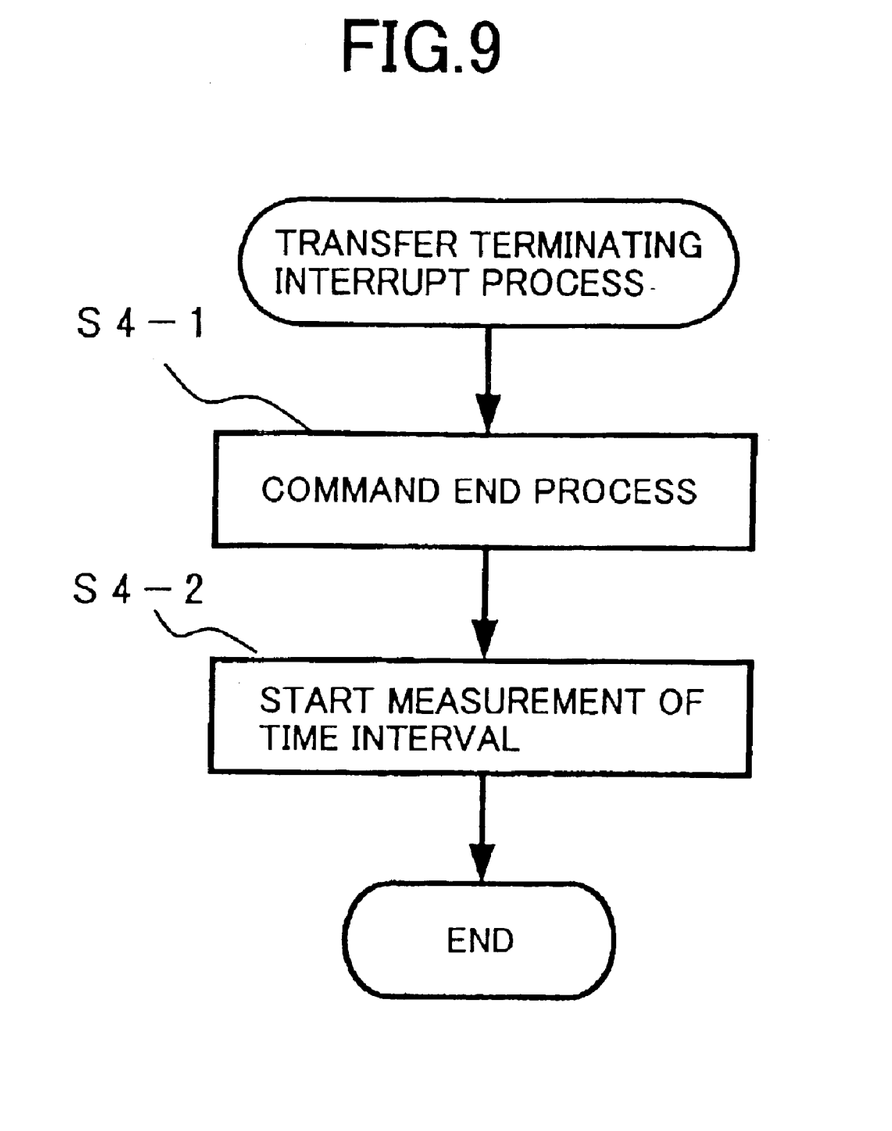
FIG. 9 is a flow chart of a transfer interruption process of a control microcomputer of FIG. 1.

FIG. 9 shows a flowchart of the transfer terminating interrupt process of the control microcomputer 23.

In the transfer terminating interrupt process, first, a transfer terminating interrupt is performed on the control microcomputer 23 for terminating the command requested in step S4-1. The control microcomputer 23 performs a transfer terminating interrupt in accordance with the command.

Then, the control microcomputer 23 starts measuring time intervals between commands in step S4-2.

The time interval between commands is understood as a time period from the instant at which measurement of time interval to the next command is started in step S4-2 to the instant at which the measurement of time intervals between commands is terminated in step S2-1.

As has been described above, according to the present embodiment, the time interval between commands is measured so that recording and/or reproduction can be performed at a recording- and/or reproducing-speed that corresponds to the amount of requested data. That is, when the time interval between commands is short, the recording- and/or reproducing-speed is increased and when the time interval between commands is long, the recording- and/or reproducing-speed is decreased.

Thus, according to the present embodiment, recording and/or reproduction can be performed at an optimum recording- and/or reproducing-speed not only in the case of a sequential write/read but also in the case of a random write/read.

Although the present embodiment has been described with reference to an optical disk device such as a CD-ROM, CD-R and CD-RW drive as examples of the information-recording and/or reproducing device, the present invention is not limited to optical devices. The present invention can also be applied to other disk drives such as a magnetic disk device. Also, the present invention may also be generally applied to drives capable of carrying out recording and/or reproduction operation at various speeds.

Further, the present invention is not limited to these embodiments, and variations and modifications may be made without departing from the scope of the present invention.

The present application is based on Japanese priority application No. 2002-34492 filed on Feb. 12, 2002, the entire contents of which are hereby incorporated by reference.

What is claimed is:

1. A method of recording and/or reproducing information onto/from an information storage medium, comprising the steps of:
   a) detecting a time interval between a received command and a subsequent command; and
   b) controlling recording- and/or reproducing-speed of said information on the basis of said detected time interval.

2. The method as claimed in claim 1, wherein said recording- and/or reproducing-speed of said information is controlled on the basis of a result of division of said detected time interval between commands by the number of blocks of the information sent by said received command.

3. The method as claimed in claim 2 wherein, said step a) is repeated to obtain a plurality of said time intervals and said recording- and/or reproducing-speed of said information is controlled on the basis of a result of division of the sum of said time intervals by a total number of the blocks of information sent by said received commands.

4. The method as claimed in claim 1, wherein said step a) is repeated to obtain a plurality of said time intervals and said recording- and/or reproducing-speed of said information is controlled on the basis of an average value derived by dividing the sum of said time intervals by the number of said received commands.

5. The method as claimed in claim 1, wherein said recording- and/or reproducing-speed of said information is controlled when the number of blocks of the information sent by said received command has reached a predetermined number of blocks.

6. The method as claimed in claim 1, wherein said recording- and/or reproducing-speed is controlled in a predetermined step-by-step manner.

7. The method as claimed in claim 1, wherein said information storage medium is a disk rotated by a spindle motor at a speed corresponding to said recording- and/or reproducing-speed, and rotational speed of said spindle motor is controlled on the basis of said detected time interval.

8. A device for recording information onto an information storage medium and/or reproducing information from said information storage medium, said device comprising:
   a detector for detecting a time interval between a received command and a subsequent command; and
   a controller for controlling recording- and/or reproducing-speed of said information on the basis of the detected time interval.

9. The device as claimed in claim 8, wherein said controller controls said recording- and/or reproducing-speed of said information on the basis of a result of division of said detected time interval by the number of blocks of the information sent by said received command.

10. The device as claimed in claim 9, wherein said detector repeats detection of said time interval to obtain a plurality of said time intervals and said controller controls said recording- and/or reproducing-speed of said information on the basis of a result of division of the sum of said time intervals by a total number of the blocks of information sent by said received commands.

11. The device as claimed in claim 8, wherein said detector repeats detection of said time interval to obtain a plurality of said time intervals and said controller controls said recording- and/or reproducing-speed of said information on the basis of an average value derived by dividing the sum of said time intervals by the number of said received commands.

12. The device as claimed in claim 8, wherein said controller controls said recording- and/or reproducing-speed of said information when the number of blocks of the information sent by said received command has reached a predetermined number of blocks.

13. The device as claimed in claim 8, wherein said controller controls said recording- and/or reproducing-speed in a predetermined step-by-step manner.

14. The device as claimed in claim 8, wherein said information storage medium is a disk rotated by a spindle motor at a speed corresponding to said recording- and/or reproducing-speed, and said controller controls rotational speed of said spindle motor on the basis of said detected time interval.

* * * * *